United States Patent
Kato et al.

(10) Patent No.: US 6,311,996 B1
(45) Date of Patent: Nov. 6, 2001

(54) SUSPENSION ARM

(75) Inventors: Rentaro Kato, Kasugai; Masaharu Tochigi, Tochigi; Naoyuki Kawata; Naoki Nishikawa, both of Oyama, all of (JP)

(73) Assignees: Tokai Rubber Industries, Ltd., Komaki; Showa Denko K.K., Tokyo, both of (JP)

( * ) Notice: Subject to any disclaimer, the term of this patent is extended or adjusted under 35 U.S.C. 154(b) by 0 days.

(21) Appl. No.: 09/432,277

(22) Filed: Nov. 2, 1999

(30) Foreign Application Priority Data

Nov. 5, 1998 (JP) .................................. 10-315076

(51) Int. Cl.$^7$ ...................................... B60G 3/04
(52) U.S. Cl. .................................. 280/124.134
(58) Field of Search ............... 280/124.134, 124.136, 280/124.125, 124.135, 124.143

(56) References Cited

U.S. PATENT DOCUMENTS

| | | | |
|---|---|---|---|
| 5,322,317 | * | 6/1994 | Kusaka et al. .................... 280/673 |
| 5,382,034 | * | 1/1995 | Parker et al. .................... 280/104 |
| 5,516,129 | * | 5/1996 | Kurosu et al. .................... 280/96.1 |
| 5,556,081 | * | 9/1996 | Miura et al. .................... 267/47 |
| 5,607,177 | * | 3/1997 | Kato .................... 280/673 |
| 5,662,348 | * | 9/1997 | Kusama et al. .................... 280/688 |
| 5,662,349 | * | 9/1997 | Hasshi et al. .................... 280/690 |

* cited by examiner

Primary Examiner—Paul N. Dickson
Assistant Examiner—Faye M. Fleming
(74) Attorney, Agent, or Firm—Oblon, Spivak, McClelland, Maier & Neustadt, P.C.

(57) ABSTRACT

This invention relates to a suspension arm comprised of a bent arm member, and a pair of bearing members joined to end portion thereof. The arm member of the conventional suspension is made of the aluminium alloy and manufactured by the forging. So, the arm member of hollow construction and has a bent portion is hardly manufactured by the forging. In view of this, in the present invention, the arm member 1 made of the aluminium alloy and has hollow construction is manufactured by the extrusion, and bent before a pair of bearing members 2,3 are joined to each of end portions.

18 Claims, 4 Drawing Sheets

SUSPENSION ARM

BACKGROUND OF THE INVENTION

1. Field of the Invention

This invention relates to a suspension arm used in a suspension mechanism mounted on a vehicle.

2. Related Art

Conventionally, in a suspension mechanism mounted on a vehicle, a suspension arm connected with an another connecting bar in a vibration preventing condition and forms a link mechanism has been used. This suspension arm is manufactured by or made of mainly a ferrous material and formed by a press working or a forging. Recently, for lightening the suspension arm, a light metallic materials such as an aluminium alloy and the like formed by the forging have been adopted.

By the way, the suspension arm can have various shapes corresponding to an attached location thereof to the vehicle. For example, an upper arm attached to an upper portion of the suspension mechanism and a lower arm attached to a lower portion of the suspension arm have bent shapes such as an arch shape, V-shape or U-shape. However, when these bent suspension are formed by forging the aluminium alloy, the suspension arm of hollow shape is hardly formed, which makes further lightening of the suspension arm difficult.

In addition, when the suspension is comprised of an arm member and a pair of bearing members attached to both ends of the arm member, if whole of the suspension arm including the bearings are formed by the forging, a bearing to bearing distance between the bearing members provided at the both ends of the arm member requiring an especially high dimensional accuracy, can not be maintained in high accuracy. As a result, various cutting working become necessary after the forging for maintaining the dimensional accuracy, which introduces increase of a working man-hour and a manufacturing cost.

SUMMARY OF THE INVENTION

The present invention is made in view of the above mentioned circumstances, and therefore intends to provide a suspension arm for the suspension mechanism which can avoid the increase of the working man-hour and the manufacturing cost, and also can further lighten the weight thereof.

For achieving the above purpose, in the invention recited in the claim 1, a suspension arm is comprised of 1) an arm member formed into a pipe shape by extruding an aluminium alloy, and having at least a part thereof a bent portion, and 2) a pair of bearing members made of an aluminium alloy and joined to each of end portions of said arm member respectibely. The bent portion of said arm member is formed by bending said arm member after said pair of bearing members are joined to each end portion of said arm member.

According to this invention, the arm member which constitutes a main part of the suspension arm is manufactured by the light aluminium alloy and formed into a pipe shape of hollow constructions, so that an amount of the aluminium alloy is greatly decreased to lighten the suspension arm sufficiently, and a high rigidity is maintained. In addition, since this suspension arm is formed by the extrusion, only a small post working such as cut working and the like is required. Further, the bent portion of the suspension arm is formed after the paired bearing members are attached to the both ends of the suspension arm, in other words, the bearing members can be attached to the straight suspension arm, which makes the attach working of the bearing members to the arm member easy. Thus, this invention can avoid the increase of the working man-hour and the manufacturing cost, and can lighten the weight of the suspension arm sufficiently.

The arm member of this invention is formed into the pipe shape by extruding the aluminum alloy. The material of the aluminium alloy is not limitative, and the aluminium alloy of Al—Mg—Si system such as A6061T6 or 6NO1 and the like are preferably used, from a view point of strength and anti-corrosion character. As an extruding method of the arm member, a hot extruding method, which is a popular forming method of the aluminium alloy, is preferably used. As a pipe shape of the arm member, a cylindrical shape, rectangular shape or irregular hollow shape in which a plurality of independent, parallel hollow portions are formed, can be used.

The arm member of this invention has at least a part thereof, a bent portion bent into the arch shape. This bent portion can be formed over the arm member such as a semi-circle or quater circle, or can be locally formed at a central portion of the arm member such as U-shape or V-shape. This bent portion is formed by bending the arm member by a known pressing apparatus easily, after the bearing members are attached to the both end of the arm member. As a result, the bearing members can be attached to the straight arm member easily.

The bearing members of this invention is manufactured by the aluminium alloy, and can have various shape which is provided with a connecting portion to be connected to the arm member, or a cylindrical portion on which a vibration preventing member to be explained later is mounted. A material of the aluminium alloy which constitutes the bearing member is not limitative, and the aluminium alloy of Al—Mg—Si system such as A6063T6 and the like are preferably used, from viewpoint of the strength and the anti-corrosion character. The bearing member can be formed by the extruding, a die-casting or the forging.

As a join method for joining the bearing member of the aluminium alloy to the arm member of the aluminium alloy, one of the conventional, known join method such as a friction agitate joining, a frictionally abutted joining, a MIG welding and a laser welding can be used. Especially, in this invention, since the bearing members are joined to the straight arm member which has not been subjected to the bend working, the friction agitate joining or the frictionally abut joining in which a building is relatively easy and which can maintain the sufficient joining strength is preferably used. Here, "the friction agitate joining" is the joining method in which a rotating body which rotates between a pair of opposed members with contacting with them is moved, and surface portions of the both members a deforming resistance of which is reduced by a friction heat are agitated to join the both members. The "frictionally abut joining" is the joining method in which by a relative movement between the opposed members a friction heat is generated at the boundary surface, and a high temperature portion at the boundary surface is pressed and extruded to join the both members.

In the invention recited in the claim 2, an intermediate bearing member is joined to an intermediate portion of the arm member. According to this invention, since the bearing member can be joined to the portion of the arm member other than the both end portions, the suspension arm which is connected the associating member of the suspension mechanism at more than three portions can be obtained. Here, plural intermediate bearing members can be attached to plural positions on the arm member.

In the invention recited in the claim 3, the arm member has a flat surface formed at a part of an outer peripheral surface thereof in extruding and extending in the extruded direction. According to this invention, when the intermediate bearing member is joined to the arm member, the joined surface of the arm member is flat, not curved, at least in a cross-section perpendicular to the extruding direction, which can heighten the joining responsibility of the intermediate bearing member to the arm member. In addition, when the arm member is formed into the pipe shape which has an inner peripheral surface, due to formation of the flat surface at the part thereof, a modulus of section and a rigidity of the arm member can be increased, to thereby heighten the strength and durability of the arm member.

In the invention recited in the claims 4 to 6, the both end portions of the arm member, or the both bearing member at the both ends of the arm member are connected with each other by a connecting bar. According to this invention, a positional error occurred between the both ends of the arm member in bending the arm member can be corrected or absorbed when the connecting bar is attached between the both ends of the arm member or between the both bearing members. Thus, the dimensional accuracy of the shaft to shaft distance between the both bearing members attached to the both ends of the bent arm member can be increased. The connecting bar can be formed by a rigid body such as a metal, but is preferably formed by the aluminium alloy, in view of the material (aluminium alloy) of the arm member and the bearing members to which the connecting bar is connected, and lightening of the suspension arm including the connecting bar.

In the invention recited in the claim 7, the intermediate bearing member is joined to the flat surface of the arm member, which heighten the joining strength of the intermediate bearing member to the arm member. In the invention recited in the claim 6, the arm member has the semi-circular or quater circular shape, which can absorb the vivrations in various direction between the both ends and the intermediate portion of the arm member.

In the invention recited in the claims 9 and 10, a connecting members with vibration preventing fuction are attached to the bearing members at the both end of the arm member, or the intermediate bearing. According to this invention, on account of the connecting member with vibratio preventing function attached to the both bearing members or the intermediate bearing memer, the suspension arm can be connected to an another suspension arm or an attaching member easily. The connecting members with vibration preventing fuction are attached to the both bearing members or the intermediate bearing memer to connect this connecting member with another or adjacent connecting members with vibration preventing fuction. As the connecting member with vibration prevent, a vibration preventing bushing provided with a rubber elastic body for absorbing the vibration, or a ball joint provided with a joint shaft which has a cubic portion held contactingly slidably by a spherical contact with a mating member and which slides to change an axis of the joint shaft far absorbing the vibration can be used.

In the invention recited in the claim 17, the suspension arm is manufactured by a step for forming straight a pipe member extruding the aluminium alloy, a step for joining a pair of bearing members made of aluminium alloy to both end portions of the arm member, and a step for bending the straight arm member to each end portion of which the pair of bearing members are joined at least at a part, to form a suspension arm having a bent portion on the arm member.

According to this invention, the arm member of the aluminium alloy can be formed by the pipe member of the hollow construction, so that the amount of the aluminium alloy material can be greatly decreased to lighten the suspension arm, and the rigidity is maintained. Also, no additional working for accurately positioning the paired bearing at the both ends of the arm member is necessary.

PREFERRED EMBODIMENT OF THE INVENTION

Hereinafter, preferred embodiments of the present inventions will be explained with reference to attached drawings. However, it is noted that the present invention is not limited to these embodiments, but can include various variation or modification within spirit thereof.

<First Embodiment>

Figure 1:
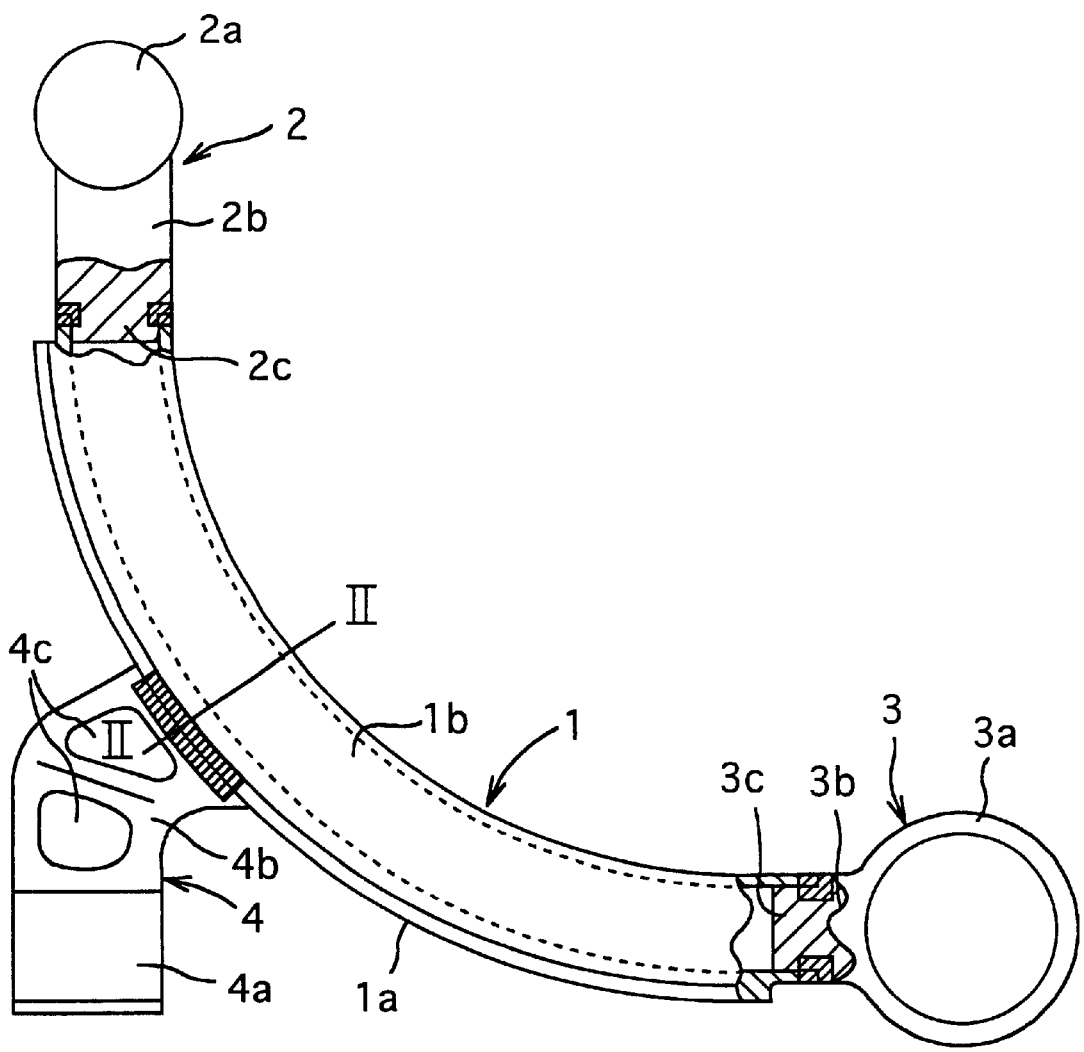
FIG. 1 is a plan view (partially broken) of the suspension arm according to a first embodiment of the present invention.
Figure 2:
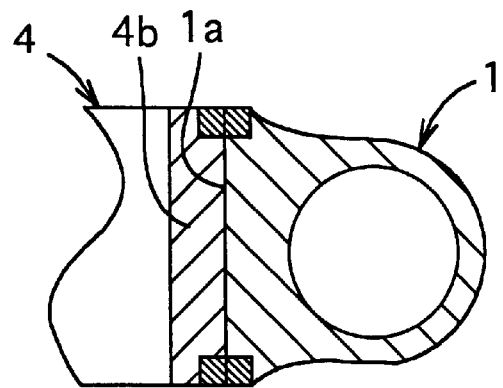
FIG. 2 is a cross-section along a line II—II in FIG. 1.

FIG. 1 is a plan view (partially broken) of the suspension arm according to a first embodiment of the present invention, and FIG. 2 is across-section along a line II—II in FIG. 1.

A suspension arm of this embodiment is comprised of, as shown in FIG. 1, an arm member 1 made of an aluminium alloy and formed into a pipe-shape by an extrud and bent into an arch-shape (quater circle), a first bearing member 2 made of an aluminium alloy and joined to one end of the arm member 1, a second bearing member 3 made of an aluminium alloy and joined to another end of the arm member 1, and an intermediate bearing member 4 joined to an intermediate portion of the arm member 1.

The arm member 1 is manufactured by extruding the aluminium alloy of Al—Mg—Si system of A6061T6 into a formed body of substantially cylindrical shape, and cutting the formed body by a predetermined length. This arm member 1 has a flat surface 1a at a part of an outer peripheral surface thereof as show in FIG. 2, which flat surface 1a is formed in extruding the arm body 1 and extending in the extruding direction to form a bent portion 1b. This arm member 1 is bent into the arch shape so that the flat surface 1a faces outwardly. Here, the bend working is carried out after the pair of bearings 2 and 3 are joined to the both ends of the arm member 1.

The first bearing member 2 is manufactured by forging the aluminium alloy of Al—Mg—Si system of A6063T6, and is comprised of a cubic portion 2a, and a shaft-like connecting base portion 2b extending from the cubic portion 2a. At a tip end of the connecting base portion 2b, a small-diameter, pillar-like engaging portion 2c is formed. The first bearing member 2 is joined to the arm member 1 by the friction agitate joining between a step surface of the small-diameter portion of the bearing member 2 and an end surface of the arm member 1, with engaging the engage portion 2c with the arm member 1. Here, this join working of the bearing member 2 is carried out in the state where the arm member 1 is straight (not bent yet).

The second bearing member 3 is manufactured by extruding the aluminium alloy of Al—Mg—Si system of A6061T6. The first bearing member 3 is comprised of a cylindrical portion 3a having a fitting hole (not shown) penetrating in an axial direction (perpendicular to a sheet surface of FIG. 2), and a shaft-like connecting base portion 3b extending from the cylindrical portion 3a. At a tip end of the connecting base portion 3b, a small-diameter, pillar-like engage portion 3c is formed. The second bearing member 3 is joined to the arm member 1 by the friction agitate joining between a step portion of the engaging portion 3c and an end surface of the arm member 1, with engaging the engage portion 3c with the arm member 1. Here, this joining working of the bearing member 3 is carried out in the state where the arm member 1 is straight (not bent yet).

The intermediate bearing 4 is manufactured by extruding the aluminium alloy of Al—Mg—Si system of A 6061T6. This intermediate bearing 4 is comprised of a cylindrical portion 4a, and a connecting base portion 4b extending from the cylindrical portion 4a like a letter of L and having two cavities 4c at a central portion thereof. As shown in FIGS. 1 and 2, a tip end surface of the connecting base portion 4b is joined to a flat surface 1a of the arm member 1 formed at a substantially central portion thereof by the friction agitate joining. The intermediate bearing member 4 is joined to the arm member 1 so that an axis of the cylindrical portion 4a is substantially perpendicular to an axis of the cylindrical portion 3a of the second bearing member 3. Here, the join working of the intermediate bearing 4 to the arm member 1 is carried out after the arm member 1 is bent.

The above mentioned suspension arm is assembled into the suspension mechanism of the automobile and used. In assembling, the cubic portion 2a of the first bearing member 2, the cylindrical portion 3a of the second bearing member 3, and the cylindrical portion 4a of the intermediate bearing member 4 are connected to an another suspension arm or an attaching member via the connecting member with vibration preventing means such as a vibration preventing bushing and the like (not shown). Thus, the suspension arm operates as one component of the suspension link mechanism, with absorbing the vibration between this suspension arm and the adjacent suspension arm by the connecting member with vibration preventing function.

As mentioned above, in the present suspension arm, the arm member 1 which is the main component thereof is made of the light aluminium alloy and formed into the pipe shape of hollow construction, so that the necessary amount of the aluminium alloy material is greatly reduced to lighten the arm member 1, and the high rigidity is maintained. Since this arm member 1 is formed by the extrusion, only small post working such as the cut working is necessary. The bent portion of the arm member 1 is formed after the first bearing member 2 and second bearing member 3 are joined to the both ends of the arm member 1, that is, the first and the second bearing members 2 and 3 are joined to the straight arm member 1, the joining operation of the both bearing members 2 and 3 to the arm member 1 becomes easy. According to the present suspension arm, sufficient lightening can be realized with avoiding the increase of the working man-hour and the manufacturing cost.

In addition, in the present suspension arm, since the intermediate bearing member 4 is joined to the intermediate portion of the arm member 1, the suspension arm can be connected to another suspension arm and the like at three points. Further, the arm member 1 of the present suspension arm has the flat surface 1a at the part of the outer peripheral surface thereof, the connecting base portion 4b can be joined to the flat surface 1a which is not curved in the cross-section perpendicular to the axis of the arm member 1. Accordingly, the joining responsibility of the intermediate bearing member 4 to the arm member 1 is heightened. Finally, the arm member 1 is formed into the pipe shape having the flat surface 1a at the outer peripheral surface, the modulus of section and the rigidity of the arm member 1 is increased to thereby realize the heighten of durability and strength.

<Second Embodiment>

Figure 3:
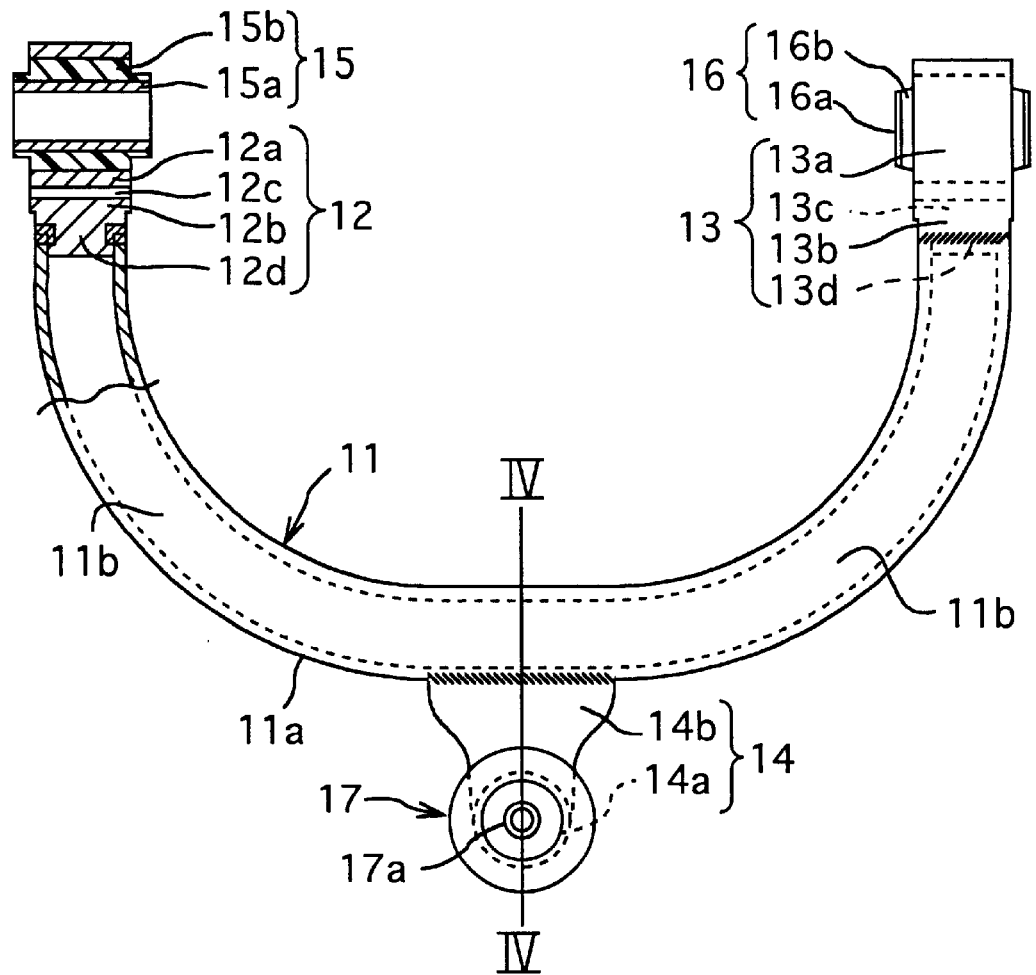
FIG. 3 is a plan view (partially broken) of the suspension arm according to a second embodiment of the present invention.
Figure 4:
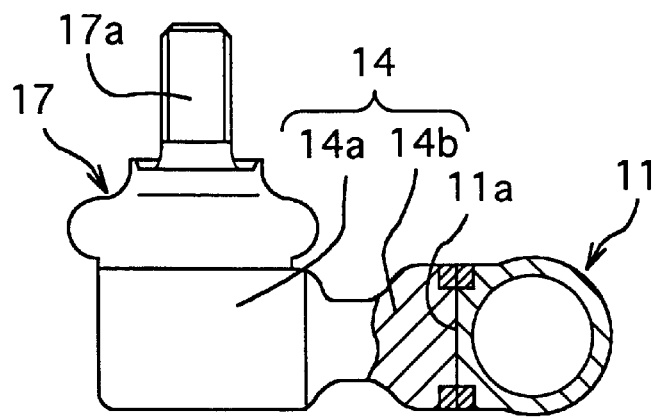
FIG. 4 is a cross-section along a line IV—IV in FIG. 3.

FIG. 3 is a plan view (partially broken) of the suspension arm according to a second embodiment of the present invention, and FIG. 4 is a cross-section along a line IV—IV in FIG. 3, according to a first embodiment of the present invention.

A suspension arm of this embodiment is comprised of, as shown in FIG. 3, an arm member 11 made of an aluminium alloy and formed into a pipe-shape by an extruding and bent into an arch-shape (U-shape); a first bearing member 12 made of an aluminium alloy, joined to one end of the arm member 11, and to which a vibration preventing bushing 15 is attached, second bearing member 13 made of an aluminium alloy, joined to another end of the arm member 11 and to which a vibration preventing bushing 16 is attached; and an intermediate bearing member 14 joined to an intermediate portion of the arm member 11, and to which a ball joint 17 is attached.

The arm member 11 is manufactured by extruding the aluminium alloy of Al—Mg—Si system of A6061T6 into a formed body of substantially cylindrical shape, and cutting the formed body by a predetermined length. This arm member 11 has a flat surface 11a at a part of an outer peripheral surface thereof, which flat surface 1 1a is formed in extruding the arm member 11 and extending in the extruding direction. This arm member 11 is bent into the U shape so that bent portions 11b are formed and the flat surface 11a faces outwardly. Here, the bend working is carried out after the pair of bearings 12 and 13 are joined to the arm member 11.

The first bearing member 12 is manufactured by extruding the aluminium alloy of Al—Mg—Si system of A6061T6. This first bearing member 12 is comprised of a cylindrical portion 12a which has a circular fitting hole extending axially (laterally in FIG. 3), and a connecting base portion 12b extending from an outer peripheral of the cylindrical portion 12a and having a cavity 12c therein. At a tip end of the connecting base portion 12b, a small-diameter pillar-like engaging portion 12d is formed. The first bearing member 12 is joined to the arm member 11 by the friction agitate joining between a step portion of the engaging portion 12d and an end surface of the arm member 11, with engaging the engaging portion 12d with the arm member 11. Here, this joining working of the bearing member 12 is carried out in the state where the arm member 11 is straight (not bent yet).

A vibration preventing bushing 15 joined to the first bearing member 12 is comprised of an inner cylindrical metal piece 15a which has a hollow hole extending laterally in FIG. 3 and which is formed into a pipe shape, and a cylindrical rubber elastic body 15b vulcanizedly attached to an outer peripheral surface of the inner cylindrical metal piece 15a. This vibration preventing bushing 15 is attached to the first bearing member 12 by vulcanizedly attaching the outer peripheral surface of the rubber elastic body 15b to the inner peripheral surface of the cylindrical portion 12a.

The second bearing member 13 is manufactured the same material and the same manner as the first bearing member 12, and is comprised of a cylindrical portion 13a, and a connecting base portion 13b having a cavity 13c and an engaging portion 13d therein. The second bearing member 13 is joined to the arm member 11 by the friction agitate joining between the step portion of engaging portion 13d and an end surface of the arm member 11, with engaging the engaging portion 13d with the arm member 11. The cylindrical portion 13a of the second bearing member 13 is joined to the arm member 11 so that the axis of the cylindrical member 13a is substantially parallel to the axis of the cylindrical portion 12a of the first bearing member 12. Here, this joining working of the bearing member 13 is carried out in the state where the arm member 11 is straight (not bent yet).

A vibration preventing bushing 16 attached to the second bearing member 13 is comprised of a cylindrical metal piece 16a and a rubber elastic body 16b, and is attached to the second bearing member 13 by vulcanizedly attaching the outer peripheral surface of the rubber elastic body 16b to the inner peripheral surface of the cylindrical portion 13a. Here, the vibration preventing bushings 15 and 16 are disposed coaxially.

The intermediate bearing 14 is manufactured by forging the aluminium alloy of Al—Mg—Si system of A 6063T6, and is comprised of a cylindrical portion 14a, and a connecting base portion 14b extending from the cylindrical portion 14a. As shown in FIGS. 3 and 4, a tip end surface of the connecting base portion 14b is joined to a flat surface 11a of the arm member 11 formed at a substantially central portion thereof by the friction agitate joining. Here, the join working of the intermediate bearing 14 to the arm member 11 is carried out after where the arm member 1 is bent.

A ball joint 17 attached to the intermediate bearing member 14 has a joint shaft 17a including a cubic portion contactingly slidably held by a spherically contact with a holder (not shown) contained in the cylindrical portion 14a, and extending perpendicular to a sheet surface of FIG. 3. The ball joint 17 absorbs the vibration by the displacement of the axis of the joint shaft 17a due to contacting sliding of the cubic portion.

The above mentioned suspension arm is assembled into the suspension mechanism of the automobile and used. In assembling, the vibration preventing bushing 15 of the first bearing 12, the vibration preventing bushing 16 of the second bearing member 13, and the ball joint 17 of the intermediate bearing member 14 are connected to an another suspension arm or an attaching member. Thus, the suspension arm operates as one component of the suspension link mechanism, with absorbing the vibration between this suspension arm and the adjacent suspension arm by the vibration preventing bushings 15, 16 and the ball joint 17.

As mentioned above, in the present suspension arm, the arm member 11 which is the main component thereof is made of the light aluminium alloy and formed into the pipe shape of hollow construction by the extruding, so that the same advantage as the first embodiment, for example, the necessary amount of the aluminium material is greatly reduced to lighten the arm member 1, and the high rigidity is maintained, can be obtained. In addition, since in the present suspension arm, the vibration preventing bushings 15, 16 and the ball joint 17 are attached to the arm member 11 in advance, it can be connected with another suspension arm easily.

<Third Embodiment>

Figure 5:
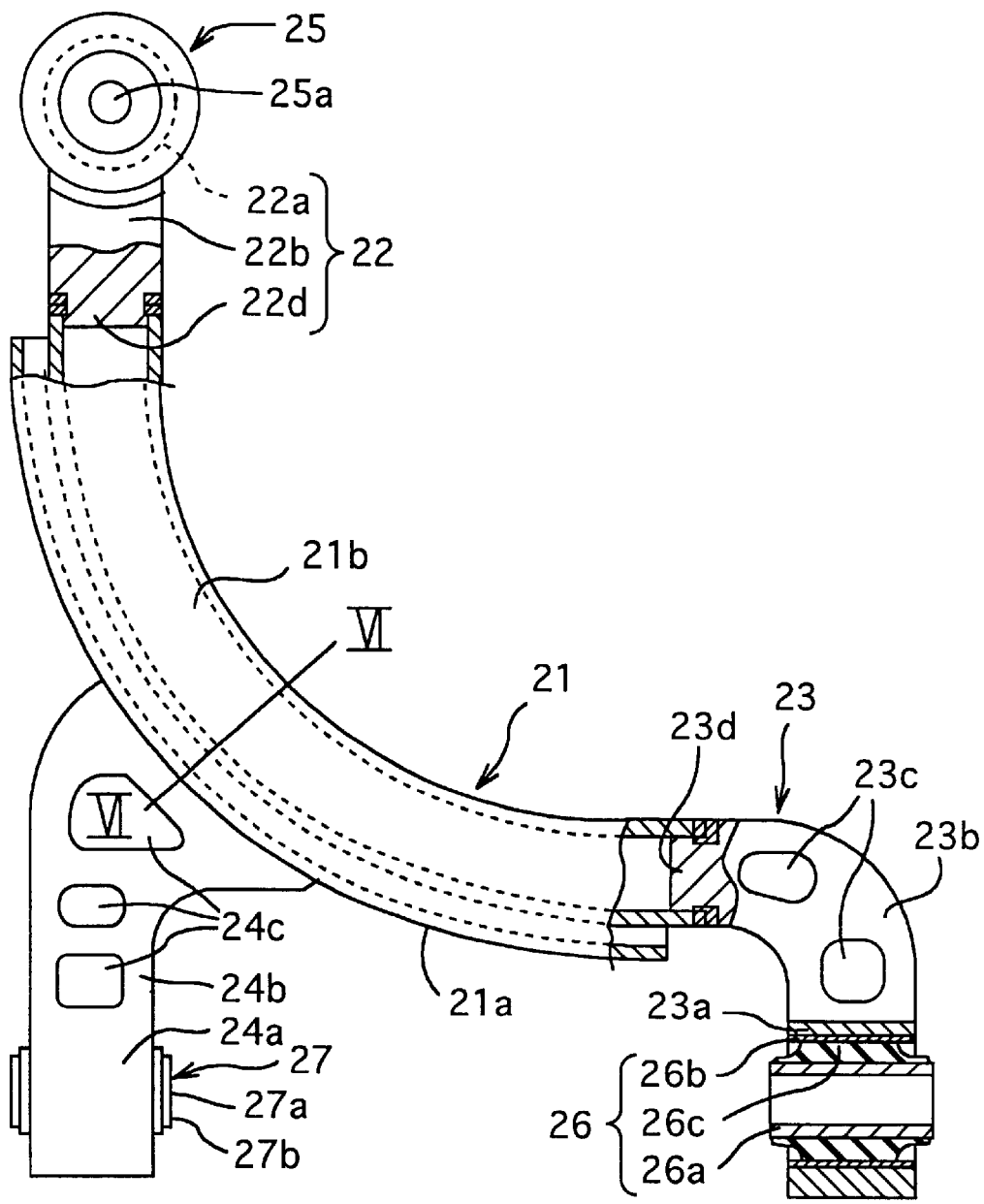
FIG. 5 is a plan view (partially broken) of the suspension arm according to a third embodiment of the present invention.
Figure 6:
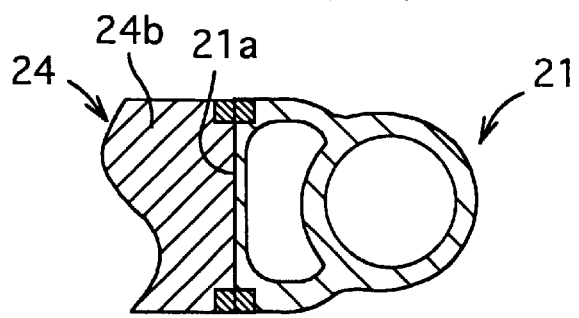
FIG. 6 is a cross-section along a line VI—IV in FIG. 5.

FIG. 5 is a plan view (partially broken) of the suspension arm according to a third embodiment of the present invention, and FIG. 6 is a cross-section along a line IV—IV in FIG. 5, according to a third embodiment of the present invention.

A suspension arm of this embodiment is comprised of, as shown in FIG. 5, an arm member 21 made of an aluminium alloy and formed into a pipe-shape by extruding and bent into an arch-shape (quater circle), a first bearing member 22 made of an aluminium, joined to one end of the arm member 1, and to which a ball joint 25 is attached; second bearing member 23 made of an aluminium alloy, joined to another end of the arm member 21, and to which a vibration preventing bushing 26 is attached; and an intermediate bearing member 24 joined to an intermediate portion of the arm member 21, and to which a ball joint 27 is attached.

The arm member 21 is manufactured by extruding the aluminium alloy of Al—Mg—Si system of A6063T6 into a formed body of substantially cylindrical shape, and cutting the formed body by a predetermined length. This arm member 21 is shaped into a pipe shape having a cavity of circular cross-section and a cavity of irregular cross-section are formed longitudinally thereof, and has a flat surface 21a formed in extruding the arm member 21 and extending in the extruding direction at a part of an outer peripheral surface thereof. This arm member 21 is bent into the U-shape so that a bent portion 21b is formed and the flat surface 21a faces outwardly. Here, the bend working is carried out after the pair of bearings 22 and 23 are joined to the arm member 21.

The first bearing member 22 is manufactured by forging the aluminium alloy of Al—Mg—Si system of A6063T6, and is comprised of a cylindrical portion 22a, and a connecting base portion 22b extending from the cylindrical portion 22a downwardly in FIG. 5. At a tip end of the connecting base portion 22b, a small-diameter, pillar-like engaging portion 22d is formed. The first bearing member 22 is joined to the arm member 21 by the friction agitate joining between a step portion of the engaging portion 22d and an end surface of the arm member 21, with engaging the engaging portion 22d with the arm member 21. Here, this join working of the bearing member 22 is carried out in the state where the arm member 21 is straight (not bent yet).

A ball joint 25 attached to the second bearing member 22 is constructed in the same manner as that of the first embodiment, and has a joint shaft 25a which includes a cubic portion contactingly slidably held by a holder contained in the cylindrical portion of the first bearing member 22, and extruding perpendicular to a sheet surface of FIG. 5.

The second bearing member 23 is manufactured by extruding the aluminium alloy of Al—Mg—Si system of A6061T6. The second bearing member 23 is comprised of a cylindrical portion 23a having a fitting hole penetrating axially therein, and a connecting base portion 23b extending from an outer periphery of the cylindrical portion 23a in a L-shape and having two cavity 23c therein. The second bearing member 23 is joined to the arm member 21 by the friction agitate joining between a step portion of the engaging portion 23d and an end surface of the arm member 21, with engaging the engaging portion 23d with the arm member 21. Here, this joining working of the bearing member 23 is carried out in the state where the arm member 21 is straight (not bent yet).

A tip end of the connecting base portion 23b extends downwardly in FIG. 5, and a vibration preventing bushing 26 is attached to the extended portion. This vibration preventing bushing 26 is comprised of an inner cylindrical metal piece 26a having a fitting hole extending laterally in FIG. 5, an outer peripheral metal piece 26b disposed coaxially therewith and outside thereof, and a cylindrical rubber elastic body 26c disposed between the inner and outer cylindrical metal pieces 26a and 26b. The vibration preventing bushing 26 is attached to the second bearing member 23 by pressing in the outer cylindrical metal peice 26b to the inner peripheral surface of the cylindrical portion 23a.

The intermediate bearing 24 is manufactured by extruding the aluminium alloy of Al—Mg—Si system of A 6061T6. This intermediate bearing 24 is comprised of a cylindrical portion 24a, and a connecting base portion 24b extending from the cylindrical portion 24a and having three cavities 24c at a central portion thereof. As shown FIGS. 5 and 6, the connecting base portion 24b is joined to a flat surface 21a of the arm member 21 formed at a substantially central portion thereof by the friction agitate joining. The intermediate bearing member 24 is joined to the arm member 21 so that the cylindrical portion 24a is substantially parallel to the cylindrical member 23a. Here, the join working of the intermediate bearing 24 to the arm member 21 is carried out after the arm member 21 is bent.

A vibration preventing bushing 27 attached to the intermediate bearing member 24 has the same construction as the vibration preventing bushing 26 attached to the second bearing member 23, and is comprised of an inner cylindrical metal piece 27a, an outer peripheral metal piece (not shown), and a cylindrical rubber elastic body 27c. The vibration preventing bushing 27 is attached to the intermediate bearing member 24 by pressing in the outer cylindrical metal peice 27b to the inner peripheral surface of the inner cylindrical portion 24a. The vibration preventing bushings 26 and 27 are disposed coaxially.

The above mentioned suspension arm is assembled into the suspension mechanism of the automobile and used in the same manner as above first embodiment. In assembling, the ball joint 25 of the first bearing member 22, the vibration preventing bushing 26 of the second bearing member 23, and the vibration preventing bushing 27 of the intermediate bearing member 24 are connected to an another suspension arm or an attaching member. Thus, the suspension arm operates as one component of the suspension link mechanism, with absorbing the vibration between this suspension arm and the adjacent suspension arm by the ball joint 25 and the vibration preventing bushings 26, 27.

As mentioned above, in the present suspension arm, the arm member 21 which is the main component thereof is made of the light aluminium alloy into the pipe shape of hollow construction by the extrusion, so that the same advantage as that of the first embodiment, for example, the necessary amount of the aluminium material is greatly reduced to lighten the arm member 21, and the high rigidity is maintained, can be obtained. Especially, the present arm member 21 is shaped into the pipe construction having the hollow portions of the cross-section and the irregular cross-section, and has the flat surface 21a at the side of the hollow portion of irregular cross-section, the modulus of section and the rigidity of the arm member 21 can be increased. This is effective to heighten the strength and durability of the arm member 21. In addition, in the present suspension arm, the ball joint 25 and the vibration preventing bushings 26, 27 are attached to the first and second bearing members 22, 23 and the intermediate bearing member 24 in advance, it can be connected with another suspension arm easily.

<Fourth Embodiment>

Figure 7:
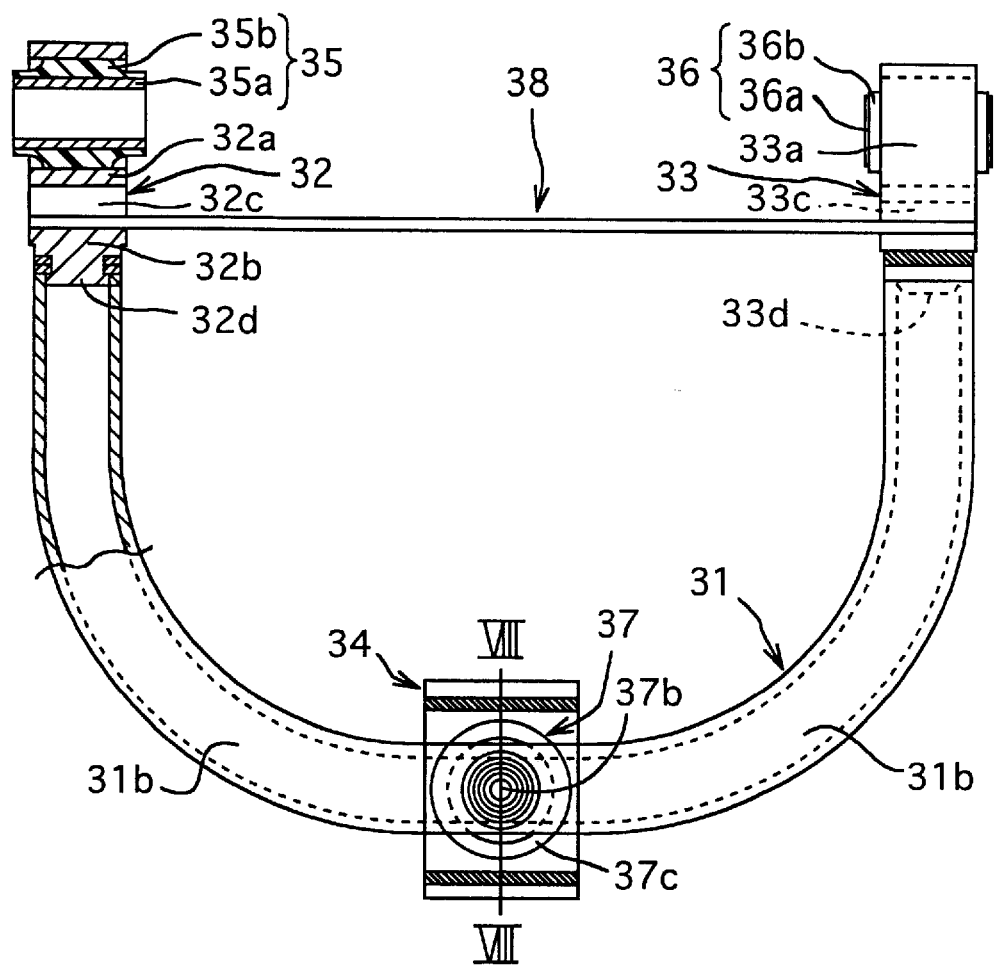
FIG. 7 is a plan view (partially broken) of the suspension arm according to a fourth embodiment of the present invention.
Figure 8:
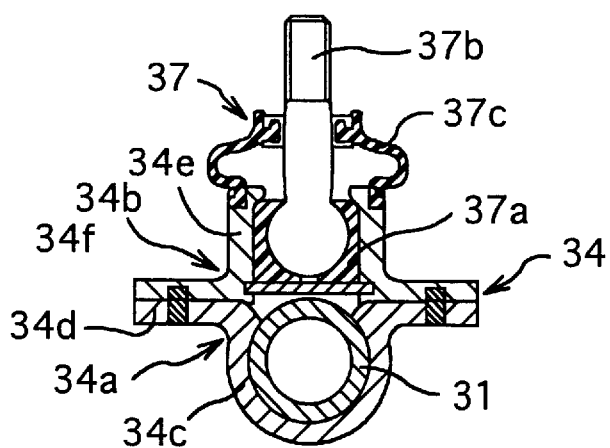
FIG. 8 is a cross-section along a line VIII—VIII in FIG. 7.

FIG. 7 is a plan view (partially broken) of the suspension arm according to a fourth embodiment of the present invention, and FIG. 8 is a cross-section along a line VIII—VIII in FIG. 7, according to the fourth embodiment of the present invention;

A suspension arm of this embodiment is comprised of, as shown in FIG. 7, an arm member 31 made of an aluminium into a pipe-shape by extruding and bent into an arch-shape (U-shape), a first bearing member 32 made of an aluminium alloy, joined to one end of the arm member 31, and to which a vibration preventing bushing 35 is attached; second bearing member 33 made of an aluminium alloy, joined to another end of the arm member 31, and to which a vibration preventing bushing 36 is attached a tip end thereof, similar to the first bearing member 32; an intermediate bearing member 34 joined to an intermediate portion of the arm member 31 to a tip of which a ball joint 37 is attached, and a connecting bar 38 connecting the first and second bearing members 32 and 33.

The arm member 31 is manufactured by extruding the aluminium alloy of Al—Mg—Si system of A6061T6 into a formed body of substantially cylindrical shape, and cutting the formed body by a predetermined length. This arm member 31 is formed into the U shape to form bent portions 31b. Here, the bend working is carried out after the pair of bearings 32 and 33 are joined to the arm member 31.

The first bearing member 32 is manufactured by extruding the aluminium alloy of Al—Mg—Si system of A6061T6 and extending upwardly in FIG. 7. This first bearing member 32 is comprised of a cylindrical portion 32a which has a circular fitting hole extending axially (laterally in FIG. 7), and a connecting base portion 32b extending from an outer peripheral of the cylindrical portion 32a and having a cavity 32c therein. At a tip end of the connecting base portion 32b, a small-diameter, pillar-like engaging portion 32d is formed. The first bearing member 32 is joined to the arm member 31 by the friction agitate joining between a step portion of the engaging portion 32d and an end surface of the arm member 31, with engaging the engage portion 32d with the arm member 31. Here, this joining working of the bearing member 32 is carried out in the state where the arm member 31 is straight (not bent yet).

A vibration preventing bushing 35 attached to the first bearing member 32 is comprised of an inner cylindrical metal piece 35a formed into a pipe shape and coaxial with the cylindrical portion 32a, and a cylindrical rubber elastic body 35b vulcanizedly attached to an outer peripheral surface of the inner cylindrical metal piece 35a. This vibration preventing bushing 35 is attached to the first bearing member 32 by vulcanizedly attaching the outer peripheral surface of the rubber elastiic body 35b to the inner peripheral surface of the cylindrical portion 32a.

The second bearing member 33 is manufactured the same material and the same manner as the first bearing member 32, and is comprised of a cylindrical portion 33a, and a connecting base portion 33b having a cavities 33c and an engaging portion 33d therein. The second bearing member 33 is joined to the arm member 31 by the friction agitate joining between a step portion of the bearing member 33 and an end surface of the arm member 31, with engaging the engaging portion 33d with the arm member 31 similar to the first baring member 32. The cylindrical portion 33a of the second bearing member 33 is joined to the arm member 31 so that the axis of the cylindrical member 33a is substantially parallel to the axis of the cylindrical portion 32a of the first bearing member 32. Here, this join working of the bearing member 33 is carried out in the state where the arm member 31 is straight (not bent yet).

A vibration preventing bushing 36 attached to the second bearing member 33 is comprised of a cylindrical metal piece 36a and a rubber elastic body 36b, similar to the vibration preventing bushing 35, and is attached to the second bearing member 33 by vulcanizedly attaching the outer peripheral surface of the rubber elastic body 36b to the inner peripheral surface of the cylindrical portion 33a. The vibration preventing bushings 35 and 36 are disposed coaxially.

The intermediate bearing 34 is manufactured by forging the aluminium alloy of Al—Mg—Si system of A 6063T6, and is comprised of a first member 34a and a second member 34b.

The first member 34a includes an arch portion 34c formed into an arch shape coinciding with the outer peripheral surface of the arm member 31, and a pair of plane portions 34d extending oppositely from both ends of the arch portion 34c, to have a Ω-shape. The second member 34b includes a cylindrical portion 34e, and a flange 34f extending from one end of the cylindrical portion 34e and havaing a rectangular shape coinciding with the plane portion 34d of the first member 34a.

This intermediate bearing member 34 is attached to the arm member 31, by MIG welding with closely contacting the arch portion 34c of the first member 34a with the outer peripheral surface of the central portion of the arm member 31, and by friction agitate connecting the flange 34f of the second member 34b with the plane portion 34d of the first member 34a. Here, this connecting of the intermediate bearing member 34 to the arm member 31 is carried out before the arm member 31 is bent, in the straight condition.

A ball joint 37 mounted to the intermediate member 34 is comprised of a holder 37a contained and held in the cylindrical portion 34e of the second member 34b, a joint shaft 37b having a cubic portion sphereically contacting with and slidably held by the holder 37a and extending perpendicular to the sheet surface of FIG. 7, and a cylindrical rubber cover 37c of which both ends are fixed to an opened portion of the cylindrical portion 34e and a central portion of the joint shaft 37b and covering the opened portion of the cylindrical portion 34e.

The connecting bar 38 is manufactured by extruding the aluminium alloy of Al—Mg—Si system of A6061T6. Both ends of the connecting bar 38 are fixed to outer peripheral surfaces of the connecting base portions 32b, 33b of the first and second bearing members 32 and 33 respectively. The connecting bar 38 is attached to the arm member 31 after the first and second bearing members 32 and 33 are joined to the arm member 31 and the arm member 31 is bent.

The above mentioned suspension arm is assembled into the suspension mechanism of the automobile to be used similar to the first embodiment. In assembling, the vibration preventing bushing 35 of the first bearing 32, the vibration preventing bushing 36 of the second bearing member 33, and the ball joint 37 of the intermediate bearing member 34 are connected to an another suspension arm or an attaching member. Thus, the suspension arm operates as one component of the suspension link mechanism, with absorbing the vibration between this suspension arm and the adjacent suspension arm by the vibration preventing bushings 35, 36 and the ball joint 37.

As mentioned above, in the present suspension arm, the arm member 31 which is the main component thereof is made of the light aluminium alloy into the pipe shape of hollow construction by the extrusion, so that the same advantage as the first embodiment, for example, the necessary amount of the aluminium material is greatly reduced to lighten the arm member 1, and the high rigidity is maintained, can be obtained. In addition, in the present suspension arm, the connecting bar 38 is spanned between the first and second bearing members 32 and 33. As a result, a positional error occurred between the both ends of the arm member 31 in bending the arm member 31 can be absorbed or corrected by the connecting bar 38 when it is spanned and fixed to the both ends of the bent arm member 31. Thus, the dimensional accuracy of the shaft-to-shaft distance between the first and second bearing members 32 and 33 can be increased.

In the above econd embodiment shown in FIGS. 3 and 4, the first bearing member 12 and the second bearing member 13 can be connected by the connecting member such as above conneting bar 38.

What is claimed is:

1. A suspension arm, comprising:
    an arm member formed into a pipe shape by extruding an aluminium alloy, and having at least a bent portion at a part thereof; and
    a pair of bearing members made of an aluminium alloy and joined to each of end portions of said arm member respectively, said bearing members being formed in such a manner that said bearing members are isolated from said arm member, said pair of bearing members being respectively joined to both end portions which are cut in an extruded direction of an extrusion of said arm member,
    wherein the bent portion of said arm member is formed by bending said arm member after said pair of bearing members are joined to each end portion of said arm member.

2. A suspension arm according to claim 1, wherein an intermediate bearing member is joined to an intermediate portion of said arm member.

3. A suspension arm according to claim 2, wherein said arm member has a flat surface formed in extruding said arm member at a part of an outer peripheral surface thereof, and extending in the extruding direction.

4. A suspension arm according to claim 1, wherein a connecting bar is spanned between both end portions of said arm member, or between said pair of bearing members.

5. A suspension arm according to claim 2, wherein a connecting bar is spanned between both end portions of said arm member, or between said pair of bearing members.

6. A suspension arm according to claim 3, wherein a connecting bar is spanned between both end portions of said arm member, or between said pair of bearing members.

7. A suspension arm according to claim 3, wherein said intermediate bearing member is joined to the flat surface formed on said arm member.

8. A suspension arm according to claim 1, wherein said arm member has a U-shape or a quater-circle shape.

9. A suspension arm, comprising:
    an arm member formed into a pipe shape by extruding an aluminium alloy, and having at least a bent portion at a part thereof;
    a pair of bearing members made of an aluminium alloy and joined to each of end portions of said arm member respectively; and
    a connecting member having means for preventing vibration attached to a tip end of each of said pair of bearing members,
    wherein the bent portion of said arm member is formed by bending said arm member after said pair of bearing members are joined to each end portion of said arm member.

10. A suspension arm according to claim 7, wherein an intermediate bearing member is joined to an intermediate portion of said arm member.

11. A suspension arm according to claim 8, wherein said arm member has a flat surface formed in extruding said arm member at a part of an outer peripheral surface thereof, and extending in the extruding direction.

12. A suspension arm according to claim 9, wherein a connecting bar is spanned between both end portions of said arm member, or between said pair of bearing members.

13. A suspension arm according to claim 10, wherein a connecting bar is spanned between both end portions of said arm member, or between said pair of bearing members.

14. A suspension arm according to claim 11, wherein a connecting bar is spanned between both end portions of said arm member, or between said pair of bearing members.

15. A suspension arm according to claim 10, wherein a connecting member is attached to a tip end portion of said intermediate bearing member, said connecting member having means for preventing vibration.

16. A suspension arm according to claim 9, wherein said arm member has a U-shape or a quater-circle shape.

17. A suspension arm, comprising:

an arm member formed into a pipe shape by extruding an aluminium alloy, and having at least a bent portion at a part which is formed by bending said arm member in a different direction from an extruded direction; and a pair of bearing members made of an aluminium alloy being isolated from said arm member, and joined to both end portions which are cut in an extruded direction of an extrusion of said arm member.

18. A suspension arm, comprising:

an arm member having a generally cylindrical shape made of an extruded aluminium alloy, said arm member having a bent portion configured such that said arm member is bent in a direction different from an extrusion direction of said arm member; and a first bearing member joined to a first end portion of said arm member; and a second bearing member joined to a second end portion of said arm member.

* * * * *